UNITED STATES PATENT OFFICE.

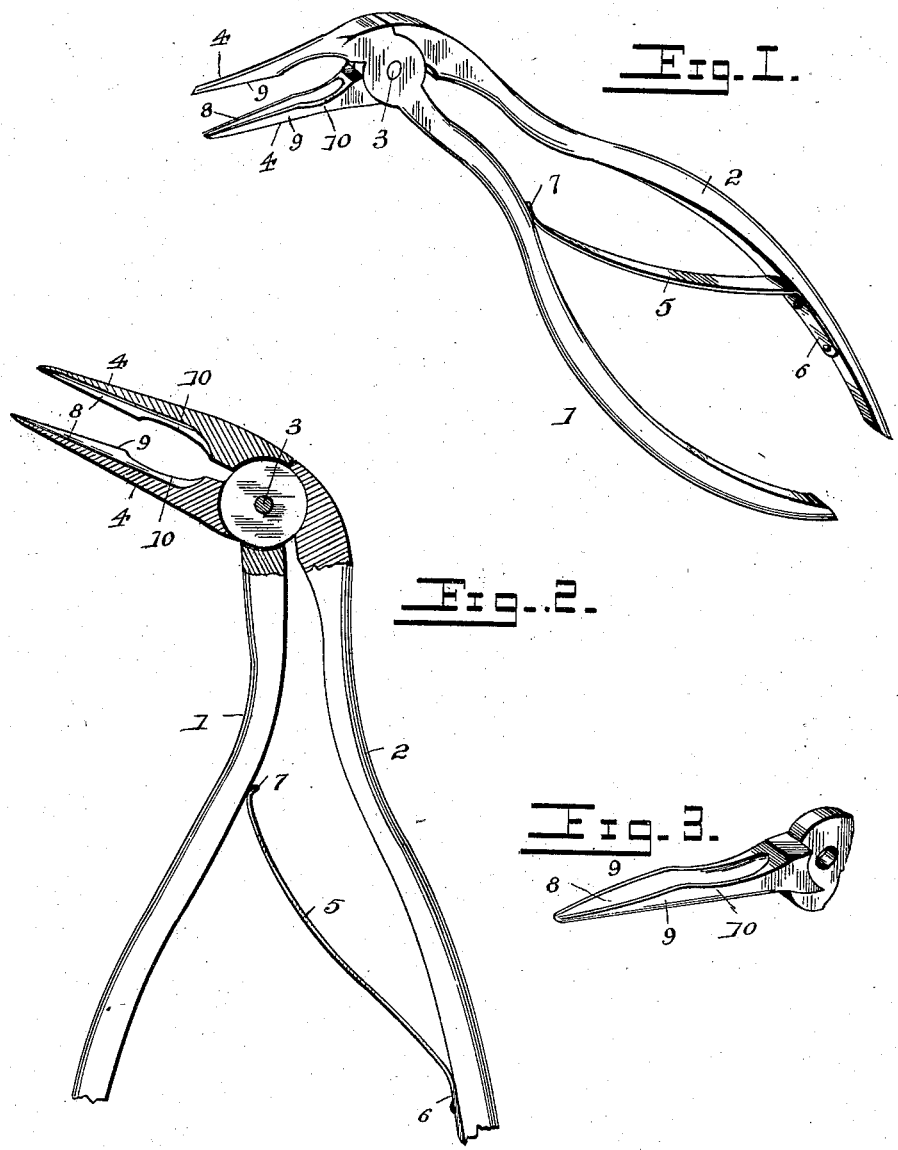

THOMAS J. BARGER, OF FORD'S FERRY, KENTUCKY, ASSIGNOR TO GEORGE W. ROBINSON, OF MARION, KENTUCKY.

TOBACCO-SUCKER REMOVER.

SPECIFICATION forming part of Letters Patent No. 663,003, dated December 4, 1900.

Application filed April 11, 1900. Serial No. 12,477. (No model.)

*To all whom it may concern:*

Be it known that I, THOMAS J. BARGER, a citizen of the United States, residing at Ford's Ferry, in the county of Crittenden and State of Kentucky, have invented a new and useful Tobacco-Sucker Remover, of which the following is a specification.

The invention relates to improvements in devices for removing suckers from tobacco-plants.

The object of the present invention is to provide a simple, inexpensive, and efficient implement capable of entirely removing suckers or shoots from tobacco-plants, so that only one operation a season will be necessary to effect this result.

The invention consists in the construction and novel combination and arrangement of parts hereinafter fully described, illustrated in the accompanying drawings, and pointed out in the claims hereto appended.

In the drawings, Figure 1 is a perspective view of a device constructed in accordance with this invention. Fig. 2 is a longitudinal sectional view of the same. Fig. 3 is a detail perspective view of one of the jaws.

Like numerals of reference designate corresponding parts in all the figures of the drawings.

1 and 2 designate two bars or members connected together between their ends by a pivot 3 and having their outer portions arranged at an angle and forming similar jaws 4, which are adapted for removing suckers from tobacco-plants. The inner or handle portions of the bars or members 1 and 2 are curved outward, as clearly shown in Fig. 1, to form a convenient grip, and they are normally held separated by a spring 5, interposed between them and having its outer end 6 secured to the inner face of one of the bars or members and its inner end 7 loosely bearing against the other. The bars or members are enlarged at their pivotal point and are recessed at their inner faces to provide a knuckle-joint, and the outer faces of the adjacent portions of the bars or members are located in the same plane and are flush with each other.

The jaws 4, which are tapered, are substantially semiconical and form practically a cone when they are closed, and they are provided at their inner faces with tapering longitudinal grooves or gutters 8, gradually increasing in width, as clearly shown in Fig. 3. The edges 9 at opposite sides of the grooves converge toward the outer ends of the jaws and are sharp, and the pointed ends of the jaws are adapted to be introduced between the stem of a leaf and the stalk of a plant a sufficient distance to remove a sucker completely from a tobacco-plant, so that it will be only necessary to operate on a plant once a season. By removing the shoots or suckers in this manner the entire strength of the stock goes to the leaf and is not consumed in nourishing suckers, and much finer tobacco is thereby produced. The outer faces of the jaws are rounded, and the inner faces are adapted to conform to the configuration of a shoot or sucker, and the said inner faces of the jaws are recessed at their inner portions at 10 to provide an opening when the jaws are closed upon a shoot or sucker, so that the same should it be of greater length than the jaws may extend outward through the said opening, whereby it will not interfere with the operation of the device.

Changes in the form, proportion, size, and the minor details of construction within the scope of the appended claims may be resorted to without departing from the spirit or sacrificing any of the advantages of this invention.

What is claimed is—

1. A device of the class described comprising two jaws tapering to a point and provided with tapering longitudinal grooves and adapted to engage a shoot or sucker, and means for operating the jaws, substantially as described.

2. A device of the class described comprising two bars or members pivoted together between their ends, and provided at their outer ends with tapering jaws, having longitudinal grooves and recessed at their inner portions to provide an opening, substantially as and for the purpose described.

In testimony that I claim the foregoing as my own I have hereto affixed my signature in the presence of two witnesses.

THOMAS J. BARGER.

Witnesses:
D. WOODS,
R. C. WALKER.